United States Patent
Kneuer et al.

[11] Patent Number: 5,913,216
[45] Date of Patent: Jun. 15, 1999

[54] SEQUENTIAL PATTERN MEMORY SEARCHING AND STORAGE MANAGEMENT TECHNIQUE

[75] Inventors: Joseph George Kneuer, Fair Haven; Alexander John Goodwin Shaw, Hazlet, both of N.J.

[73] Assignee: Lucent Technologies, Inc., Murray Hill, N.J.

[21] Appl. No.: 08/618,163

[22] Filed: Mar. 19, 1996

[51] Int. Cl.[6] .................................................. G06F 17/30
[52] U.S. Cl. .................... 707/101; 707/100; 707/206; 707/205; 707/200; 711/154; 711/160; 711/173; 711/217
[58] Field of Search .................... 707/206, 200, 707/205, 101, 100, 3; 711/173, 170, 216, 217, 136, 144, 154, 160

[56] References Cited

U.S. PATENT DOCUMENTS

| | | | |
|---|---|---|---|
| 4,197,580 | 4/1980 | Chang et al. | 711/144 |
| 4,322,795 | 3/1982 | Lange et al. | 711/136 |
| 4,458,310 | 7/1984 | Chang | 711/119 |
| 4,607,346 | 8/1986 | Hill | 711/170 |
| 4,748,439 | 5/1988 | Robinson et al. | 340/146.2 |
| 4,833,642 | 5/1989 | Ooi | 365/49 |
| 4,928,239 | 5/1990 | Baum et al. | 711/136 |
| 4,996,663 | 2/1991 | Nemes | 707/200 |
| 5,019,971 | 5/1991 | Lefsky et al. | 395/182.03 |
| 5,287,499 | 2/1994 | Nemes | 707/2 |
| 5,588,138 | 12/1996 | Bai et al. | 711/173 |
| 5,606,688 | 2/1997 | McNutt et al. | 711/170 |
| 5,633,858 | 5/1997 | Chang et al. | 370/255 |

FOREIGN PATENT DOCUMENTS

| | | | |
|---|---|---|---|
| 0 478 006 A2 | 4/1992 | European Pat. Off. | G06F 15/40 |
| 3801380 A1 | 7/1988 | Germany | G06F 15/40 |
| WO 92/09960 | 6/1992 | WIPO | G06F 15/40 |

OTHER PUBLICATIONS

Hayashi et al., "A New Source Coding Method Based on LZW Adopting the Least Recently Used Deletion Heuristic", IEEE Pacific Rim Conference on Communications, Computers and Signal Processing, pp. 190–193 vol. 1, May 19, 1993.

Ziv, J. and Lempel, A., "A Universal Algorithm for Sequential Data Compression", *IEEE Transactions on Information Theory*, vol. IT–23, No. 3, May 1977, pp. 337–343.

Welch, t. A., "A Technique for High–Performance Data Compression", *IEEE Computer*, vol. 17, No. 6, Jun. 1984, pp. 8–19.

*Primary Examiner*—P. R. Lintz
*Assistant Examiner*—Greta L. Robinson

[57] ABSTRACT

The adaptive sequential pattern memory search technique only examines the contents of a subset of the total number of memory locations in each search for information representative of a character string. The subset includes a plurality of storage locations and each examination is performed in one concurrent read operation. If the character string is not matched, the memory must be updated to store information representative of the unmatched string. This updating process selects one location from the subset for storing this representative information. Advantageously, an indicator of when each stored representative information last matched a character string is maintained and utilized in the selection process. In addition, to avoid operational errors associated with outputting invalid information from the "child" of a previously discarded "parent", an indication of the time each stored entry is created is utilized to remove such invalid information as it is detected in the updating process.

9 Claims, 5 Drawing Sheets

|  | | 0 | 1 | 2 | 3 |
|---|---|---|---|---|---|
| FIXED "ALPHABET" | 0<br>1<br>2<br>.<br>.<br>10<br>11<br>.<br>.<br>3f | ...<br>D | A<br>... | B | C |
| SPECIAL CODES | 40 | | | | |
| DYNAMIC DICTIONARY | 41<br>5b<br><br>b3<br><br>13a<br>1ff | <br><br><br><br><br>5b-2-S<br>"CATS"<br>@207 | <br><br><br>10-3-A<br>"CA"<br>@100 | <br>b3-1-T<br>"CAT"<br>@145 | |

|   | 0 | 1 | 2 | 3 |
|---|---|---|---|---|
| FIXED "ALPHABET"   0,1,2,...,10,11,...,3f | ...<br>D | A<br>... | B | C |
| SPECIAL CODES   40 | | | | |
| DYNAMIC DICTIONARY   41, 5b, 9a, b3, 13a, 1ff |  <br> <br> <br> <br>5b-2-S<br>WAS "CATS"<br>@207 |  <br> <br> <br>10-3-A<br>"CA"<br>@100 | 9a-3-G<br>"DOG"<br>@831 | 11-0-0<br>"DO"<br>@752 |

SEQUENTIAL PATTERN MEMORY SEARCHING AND STORAGE MANAGEMENT TECHNIQUE

This patent application is related to previously filed patent application Ser. No. 08/378,916 and previously filed patent application Ser. No. 07/969,645, both which were filed by the present Applicants, and both of which are now abandoned.

TECHNICAL FIELD

The present invention relates to memory searching and storage management and, more particularly, to such a technique for an adaptive sequential pattern memory.

BACKGROUND OF THE INVENTION

A sequential pattern memory is a type of memory having many information storage locations where the information stored in one location, designated as a "child" location, is related to priorly stored information in another location. This other location is referred to as the "parent". In this parent-child relationship, each child has only one parent but each parent may have many children.

Adaptive sequential pattern memories are used in a variety of applications, such as data compression. The Lempel-Ziv-Welch (LZW) algorithm is a well-known data compression technique which is particularly desirable as it asymptotically reaches the provable maximum compression for large bodies of data. In an encoder, the operation of this algorithm may be summarized by stating that the encoder receives an input digital signal stream and "tokens" representative of digital signal sequences or "strings" formed from this stream are outputted. As this process continues, each transmitted token represents longer and longer strings, and thereby data compression is achieved. In the decoder, the transmitted tokens are decoded to recreate the digital signal stream. In any practical application, implementation of this algorithm involves the use of a memory for storing the tokens representative of the different strings.

Searching a memory refers to the operation of examining the contents of the memory to find stored information corresponding to the given input signal pattern. In data compression applications utilizing the LZW algorithm or others, the number of memory locations storing information grows rapidly. One problem with this growth is that the larger the memory to be searched, the longer the search time. Another problem with certain data compression algorithms, such as LZW, is that it is assumed that the memory is unbounded. Obviously, in practical applications, the memory size is finite and, once filled, some arrangements must be made to determine which information stored in memory should be discarded and replaced by new unstored information. This determination is complicated by the fact that the discarding of information in a parent location renders the information stored in any child of this parent invalid. Furthermore, the task of locating and discarding all children of any discarded parent can be a time-consuming process.

One prior art technique to update memories in data compression applications discards everything in memory once performance begins to slacken. As a result, data compression performance falters until the memory is rebuilt in both the encoder and decoder. Other techniques have discarded information based on a criteria which discards information deemed to be least valuable. These latter procedures have had to utilize far less than optimum criteria as information in parent locations could not be discarded without enduring the time-consuming process of locating and removing any child of a discarded parent.

It would, therefore, be desirable if a technique could be developed for finite sequential pattern memories which is fast, easily implementable and utilizes an efficient discarding criteria.

SUMMARY OF THE INVENTION

Broadly, the present invention overcomes the limitations of prior art memory searching and updating techniques by utilizing the notion of a subset of memory locations to provide searching and updating operations. The subset includes a fixed number of memory locations which is substantially less than the total number of memory locations. Each searching operation is performed on only one associated subset, and any required updating operation is provided by selecting a memory location from this subset. As a result, each search or updating process can be performed in one read/write operation.

In the disclosed embodiment of the present invention which pertains to a data compressing encoder, tokens are outputted in response to digital signal sequences which have been previously formed from a digital signal stream. The determination of whether each digital signal sequence has been priorly formed involves an examination of the contents of a subset of memory locations. When information representative of a formed digital signal sequence is not found in the subset, a location in the subset is selected for storing such representative information. The selection process advantageously selects one location from all locations in the subset. To avoid prior art problems resulting from the overwriting of representative information in a parent location, an indicator of time of creation of each stored entry is preferably utilized to prevent the outputting of information from the child of a previously discarded parent. In the data expanding decoder, the digital signal stream is recreated from the transmitted tokens. The same notion of subset selection used in the encoder is used to update the decoder memory to match that of the encoder.

DETAILED DESCRIPTION

At the outset, it would be helpful to briefly review the basic operations of the LZW compression algorithm and describe the shortcomings overcome by the present invention.

An LZW encoder transforms an incoming sequence of agreed upon basic characters, each typically 8 bits, into one or more tokens. The totality of agreed upon basic characters is referred to as the "native character set." The process of encoding each sequence involves retrieving the characters in the sequence, one at a time, to form a succession of "character strings." The memory of the encoder/decoder is then searched to determine whether it has stored the sequence of characters in the current character string. Whenever the sequence of characters in the current string is found in memory, the search process is repeated for a new character string formed by appending the next character in the input signal sequence onto the last matched character string. However, when the sequence of characters in the current string is not stored in memory, information representative of this unmatched character string is stored and a token of the last matched string is outputted. In addition, a new character string is formed which includes only the last character of the unmatched character string and the memory search is begun again for this new string.

The problem in the above procedure of long search times associated with large memory searches is overcome in accordance with the present invention by only examining a subset of the memory to determine the presence or absence of each character string. This subset includes a predetermined number of memory locations which is substantially smaller than the total number of memory locations. In the disclosed embodiment, there are four memory locations in each subset. The particular subset examined is a function of the current character string and, in the disclosed embodiment, is determined by utilizing the well-known technique of hashing to convert each character string into an associated plurality of memory addresses. More specifically, in the disclosed embodiment, the hashed character string determines the row of a plurality of memory addresses. If an identity exists between the current string and data stored in one of the examined memory locations, a new character string is formed by concatenating the next character in the incoming character sequence onto the last matched string. The search process is then repeated for this new string. If, at any time, an identity does not exist between the information in the examined memory locations and the current character string, the unmatched string is stored in one of the examined memory locations and a new string is formed including only the last character of the unmatched string. The search process is then repeated for this new string. When all examined memory locations are already storing information, the present invention advantageously utilizes a criteria to determine which memory location in the subset is storing the least valuable information and this information is replaced by information representative of the unmatched string. In particular, a time stamp indicative of the last time the information in each memory location matched a character string is maintained. This time stamp is hereinafter referred to as the variable "TIME_OF_LAST_MATCH." The least valuable information is then determined to be the information in the examined subset whose time of access is least recent. The criteria is hereinafter referred to as the "least recently used" (LRU) criteria. Another time stamp, hereinafter referred to as the "time of creation," is also advantageously used to prevent errors associated with the outputting of information from any child location of a previously discarded parent.

Figure 1:
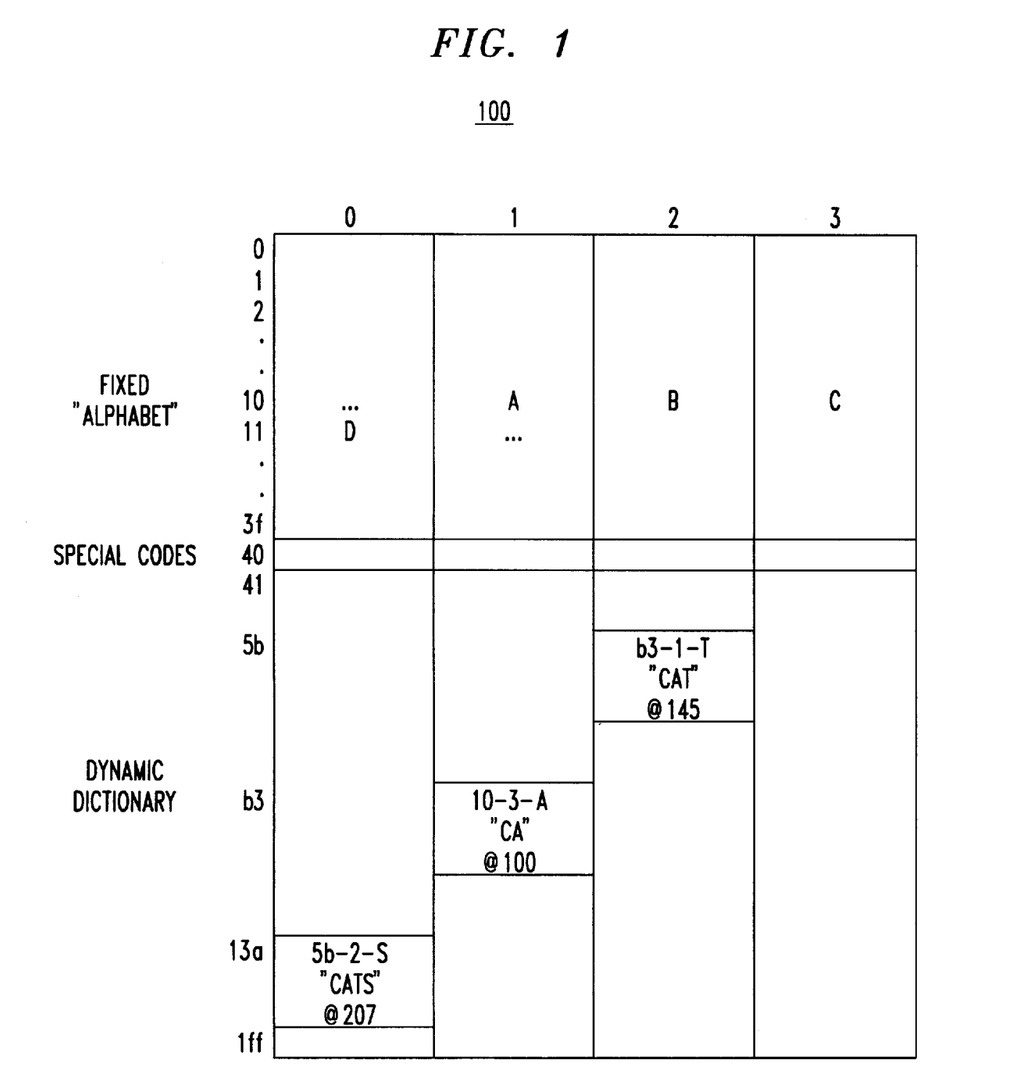
FIGS. 1 and 2 are representations of an illustrative sequential pattern memory which operates in accordance with the present invention.

Refer now to FIG. 1 which depicts the operation of applicants' invention for an illustrative memory 100. As shown, memory 100 has a plurality of rows, designated by the numbers 0, 1, 2 . . . 1$f$, in the left-hand vertical column, and a plurality of columns, designated by 0, 1, 2 and 3, in the top-most horizontal row. At the outset, it will be assumed that a different memory storage location in a predetermined portion of the encoder memory is associated with each agreed upon basic symbol in the native character set. In FIG. 1, the rows 0 thru 3$f$ are reserved for the native character set and, as shown, the character "A" is stored at the memory location 10-1 which numerical designation specifies that this location is in row 10 and lies in column 1. Similarly, as shown, the characters "B", "C", and "D" are respectively assigned to locations 10-2, 10-3, and 11-0. Therefore, this portion of the memory stores all possible character strings having only one character. The information stored in each of these locations for its associated basic character is only the memory address and, therefore, this portion of the memory is in actual applications only virtual memory, i.e., actual memory locations need not be used.

The portion of the memory designated by row address 40 is reserved for special codes. Such codes are well-known in the art and utilized to overcome inconsistencies which can arise when the input digital signal stream includes repetitions of the same character sequence. The present invention advantageously makes use of these special codes in the same manner as the prior art.

The portion of the memory extending from row 41 thru row 1$f$ defines the dynamic portion of the dictionary which stores priorly received or known character strings having more than one character.

Now suppose that the character "C" appears in the incoming sequence at time equal to "99" and is immediately followed by the character "A" at time equal to "100". The first character "C" is retrieved and forms the first character string. This single character string is directly mapped to the memory location 10-3. In accordance with the LZW algorithm, the token for the character "C" is saved as the last matching token. The next character "A" is now appended to the prior character string to form the current character string "CA". The input to the hash code generator is the memory location for the character "C" with the "A" appended, or 10-3-A.

For purposes of illustration, let us assume that the hash code for the value 10-3-A is b3. It should be noted that this hash code defines a subset including a plurality of memory locations. In this case, the subset is the four memory locations in row b3, namely, locations b3-0, b3-1, b3-2 and b3-3. In accordance with the present invention, only this defined subset of memory locations will be searched for the presence of the current string "CA". Now assume that this string is not found and an empty location b3-1 in the subset is selected for storing information representative of the current string "CA". This information is 10-3-A, the input to the hash code generator. Note that this information indicates the memory location in which the last match was found, namely, location 10-3, and the appended character "A". The time of creation "100" is also stored and is indicated in the FIGS. as "@ 100". For purposes of exposition, the decoding value of "CA" is also shown in the middle line of this memory location entry and those which follow. It should be understood, however, that these illustrated decoding values are for exposition only as such characters are neither stored in the encoder or decoder embodiments of the present invention.

Now assume that, at time 145, the current string is "CAT". This string hashes to the row 5$b$ and, not being found in this row, is stored in memory location 5$b$-2. Now, at some later time 207, the current string is "CATS". This string is hashed to row 13$a$ and is stored in memory location 13$a$-0. Note that the string "CAT" will not ever be stored immediately following the storage of the string "CA". This is so because in the LZW algorithm, once a string is not found in memory, it is stored, and a new string containing only the last unmatched character is formed. Therefore, when the string "CA" is not found, the next string includes only the character "A".

Figure 2:
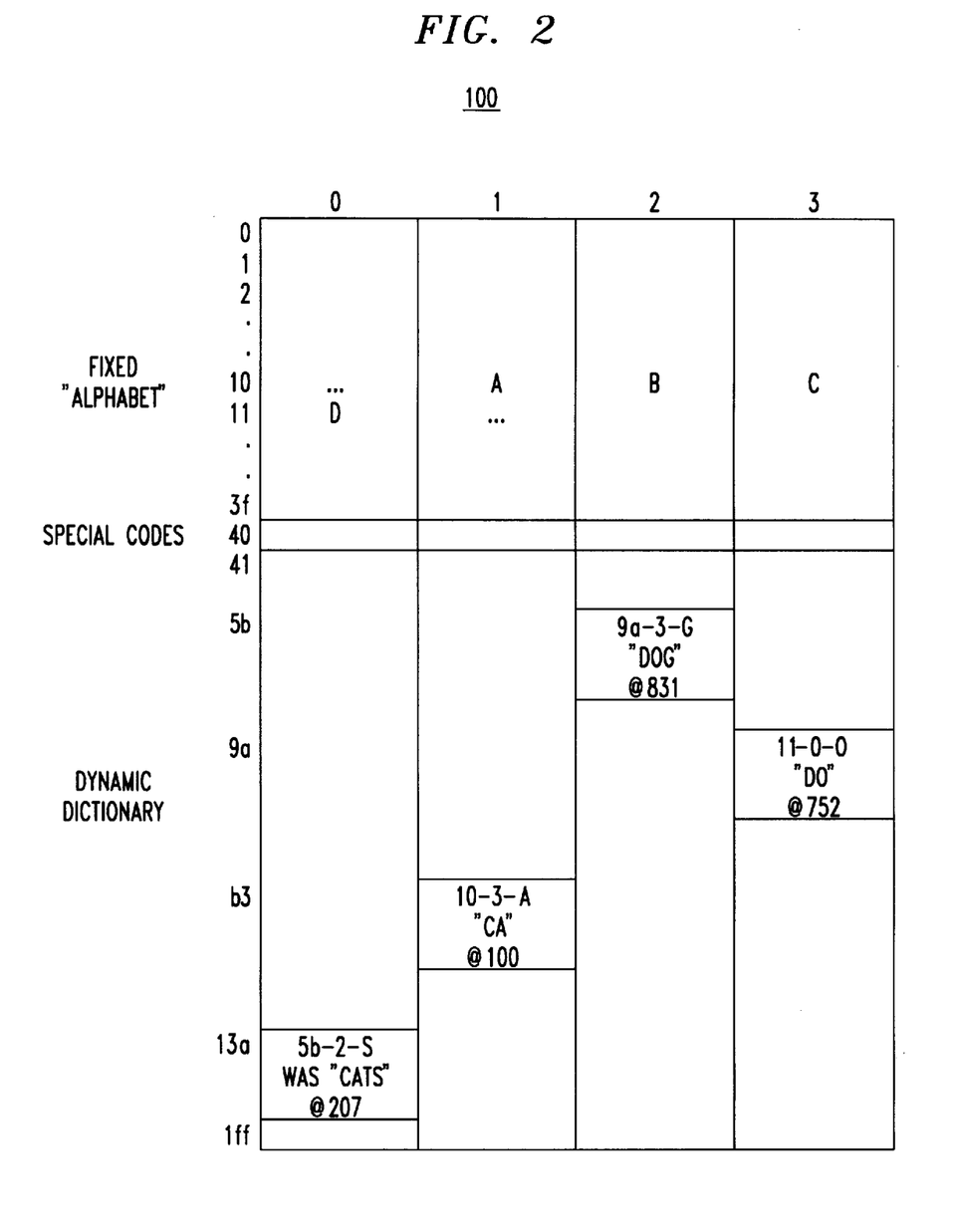

Turn now to FIG. 2, where the sequence of operations will be continued and the use of the notion of the "time of creation" will be used to recognize invalid stored information and prevent its use. At some later time 752, which is after those used in FIG. 1, the string "DO", represented by 11-0-O appears and hashes into row 9a. This information, not being found in the four memory locations in row 9a, is stored in one of the memory locations in this row. The LRU or some other criterion may be used. In any event, assume that the determined memory location is 9a-3. Storage of information representative of the current string in this location does not conflict with the information representative of the previously stored strings discussed in FIG. 1. But, at time 831, the current string is "DOG" which hashes to row 5b. Using the LRU criteria or some other, the memory location 5b-2 is selected to store the string "DOG". Therefore, information representative of the string "DOG", i.e., 9a-3-G, replaces the previously stored information b3-1-T in this memory location. This previously stored information is representative of the string "CAT". Later, at time 207, the string "DOGS" is encountered which hashes to row 13a. It would now appear that the contents 5b-2-S of memory location 13a-0 matches the string "DOGS". However, this is an error because the information stored in location 13a-0 is representative of the string "CATS" and not "DOGS". Furthermore, the outputting of the token corresponding to the contents of memory location 13a-0 would generate errors in the decoder. To prevent such errors, caused by outputting the invalid children of a previously discarded parent, the present invention compares the time of creation of the information believed to match the current string with the time of creation of the previously matched string, such as 'DOG'@ 831 (FIG. 2). When the time of creation of the previously matched string is later than the time of creation of the stored information matching the current string, the stored information is incorrect as this information is representative of the child of a previously replaced parent, i.e., "CATS" is the child of the previously replaced parent "CAT". When such a time of creation results, the present invention considers the memory location as being invalid and selects such location as the one which should be overwritten. In FIG. 2, location 13a-0 would be selected as the memory location to store the information representative of the string "DOGS" and the previously stored information would be replaced or overwritten. Consequently, pursuant to the present invention, outputting of information in any progeny of a previously discarded parent-child is prevented, on the fly, i.e., as such invalid information is detected due to a believed match with the current character string.

Figure 3:
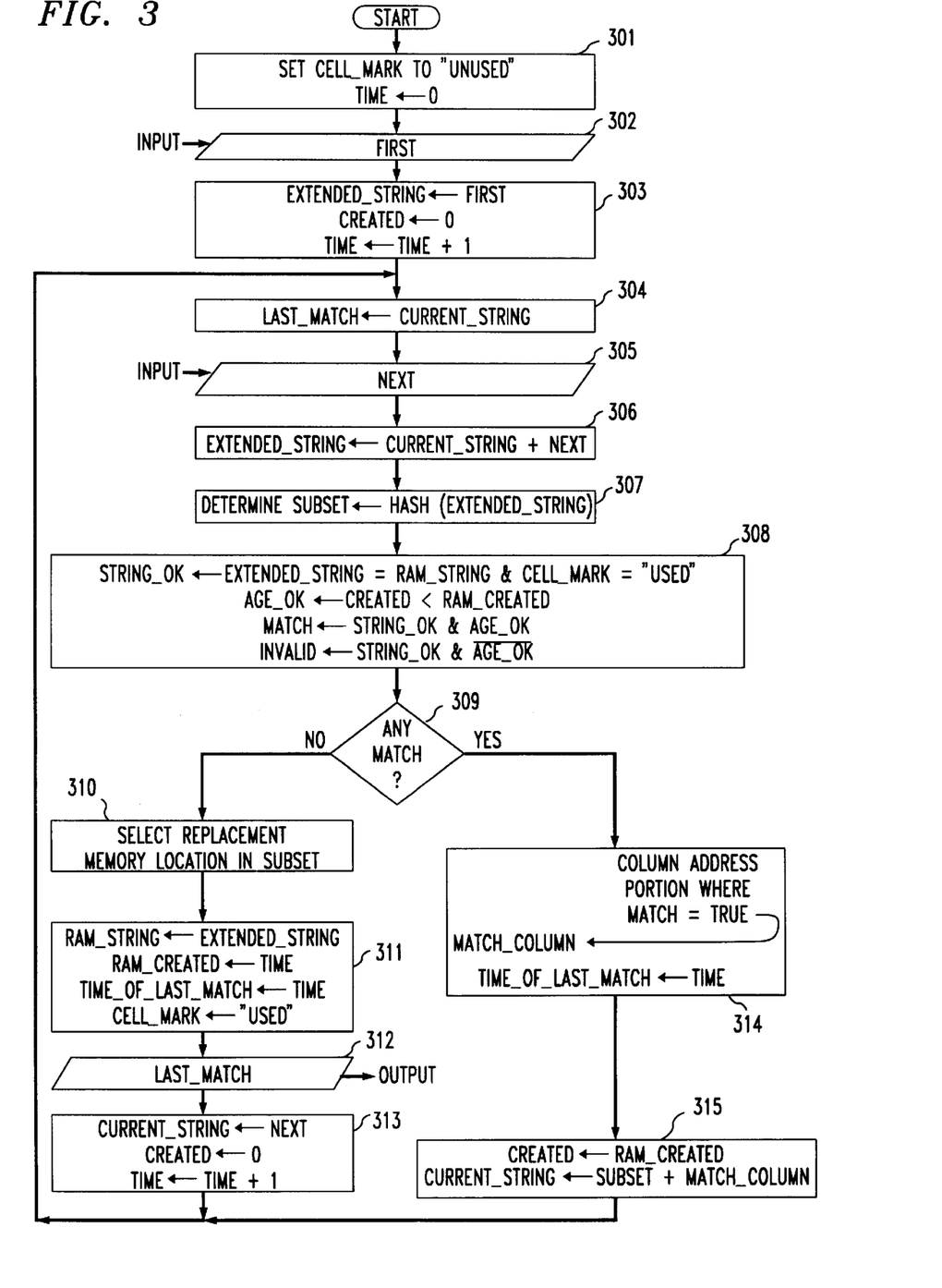
FIG. 3 is a flow chart depicting the sequence of operations performed by encoding apparatus in accordance with the present invention.

Refer now to FIG. 3. Processing begins at step 301 wherein the memory is initialized by marking all memory locations as being UNUSED and the sequencer variable "TIME" is set to 0. At step 302, the FIRST character in the incoming sequence is retrieved, and, at step 303, the variable CURRENT_STRING is loaded with the predetermined memory location of this single character of the basic character set. The value stored in variable CURRENT_STRING is always a token of the current input string, exactly the value of a memory location as previously described in reference to FIGS. 1 and 2. The variable "CREATED", at step 303, is also set to 0. A string consisting of a single basic character exists at a time equal to 0. In addition, the variable TIME is incremented by 1. At step 304, the value of CURRENT_STRING is loaded into the variable LAST_MATCH. The NEXT character in the incoming sequence is now retrieved at step 305, and concatenated with CURRENT_STRING to form a new EXTENDED_STRING at step 306. Concatenation is denoted in the FIGS. by the "+" operator. At step 307, the EXTENDED_STRING formed at step 306 is hashed to define the row address of the memory locations in the examined subset. This row address is represented by the variable "SUBSET". The hashing process is well-known and any of a variety of hash codes can be utilized. In the disclosed embodiment, a hash code was used which is capable of being generated using simple combinatorial logic. At step 308, several operations proceed in parallel. First, the EXTENDED_STRING of step 306 is compared to the information stored in each USED (as opposed to UNUSED) memory location in the memory row address determined in step 307. The variable CELL_MARK, which is one bit in each memory location, denotes USED and UNUSED cells. The variable STRING_OK is formed for each memory location in the examined subset, and a True state of the variable STRING_OK indicates that stored information in a memory location matches the EXTENDED_STRING. Second, the variable AGE_OK is formed by comparing the variable CREATED to the variable RAM_CREATED for each memory location in the examined subset. The variable CREATED is representative of the time of creation of the last matched stored information while the variable RAM_CREATED is representative of the time that information was stored in each memory location in the examined subset. RAM_CREATED is set in step 311, to be discussed. A True state of the variable AGE_OK, i.e., RAM_CREATED is later in time than CREATED in combination with the True state of the variable STRING_OK, for any memory location indicates valid information is stored in that location. A False state of the variable AGE_OK in combination with the True state of the variable STRING_OK indicates that while an identity exists between the current string and the information stored in one memory location of the examined subset, the information in this memory location is, in reality, the invalid child of a previously discarded parent. The combined presence of the True state of the variables STRING_OK and AGE_OK for a particular memory location in the examined subset establishes the parameter MATCH for that memory location. This parameter indicates a valid identity between the information stored in a particular memory location in the examined subset and EXTENDED_STRING. Another parameter denoted as INVALID represents the combination of the True state of the variable STRING_OK and the False state of the variable AGE_OK for any memory location in the examined subset. INVALID indicates that the associated memory location stores invalid information.

At step 309, a determination is made as to whether the parameter MATCH exists for any memory location in the examined subset. If the answer to this determination is Yes, then at step 314, for the particular memory location associated with MATCH, the variable TIME_OF_LAST_MATCH is loaded with the current time. This operation causes each memory location to store the time that information in that location last produced the parameter MATCH for a current string. TIME_OF_LAST_MATCH is used, as will be discussed relative to step 310, to determine the least valuable information in the examined subset. In addition, the column portion of the particular memory location associated with MATCH is loaded into the variable MATCHING_COLUMN. At step 315, the value stored in the variable RAM_CREATED is loaded into the variable CREATED, and the value of CURRENT_STRING is set to the concatenation of the variable SUBSET with MATCHING_COLUMN. From step 315, processing returns to step 304.

If the determination at step 309 is No, then the EXTENDED_STRING of step 306 must be stored in one of the memory locations in the examined subset. To select the memory location into which the EXTENDED_STRING is to be stored, an ordered sequence of decisions is followed. First, if any memory location is associated with the parameter INVALID, that location is chosen. Second, if no location is associated with the INVALID parameter, a location that is empty is chosen. Lastly, if all memory locations are being used and there is no parameter INVALID for any memory location, then the location having the least recently used TIME_OF_LAST_MATCH is selected. This last criteria assumes that the information that is of least value is that last recently matching a current string. If there are any ties in the three ordered criteria, the memory location having the lowest column number in the subset is chosen.

Now, having made a selection of the memory location to be stored, at step 311, the unmatched EXTENDED_STRING is stored in the chosen location as denoted by the parameter RAM_STRING. The current TIME is loaded into RAM_CREATED, i.e., the time of creation of this stored information, and to the TIME_OF_LAST_MATCH. The chosen memory location also has its parameter CELL_MARK set to used.

At step 312, the token for the last matching string established at step 304 is outputted. The value of this token is the memory address for either a basic character or the last successfully matched EXTENDED_STRING, the latter being determined by the immediately preceding sequence of operations at step 309. At step 313, the current string is set to the next character retrieved at step 305, the variable CREATED is loaded with 0, and the variable TIME is incremented by 1. From step 313, processing returns to step 304.

Figure 4:
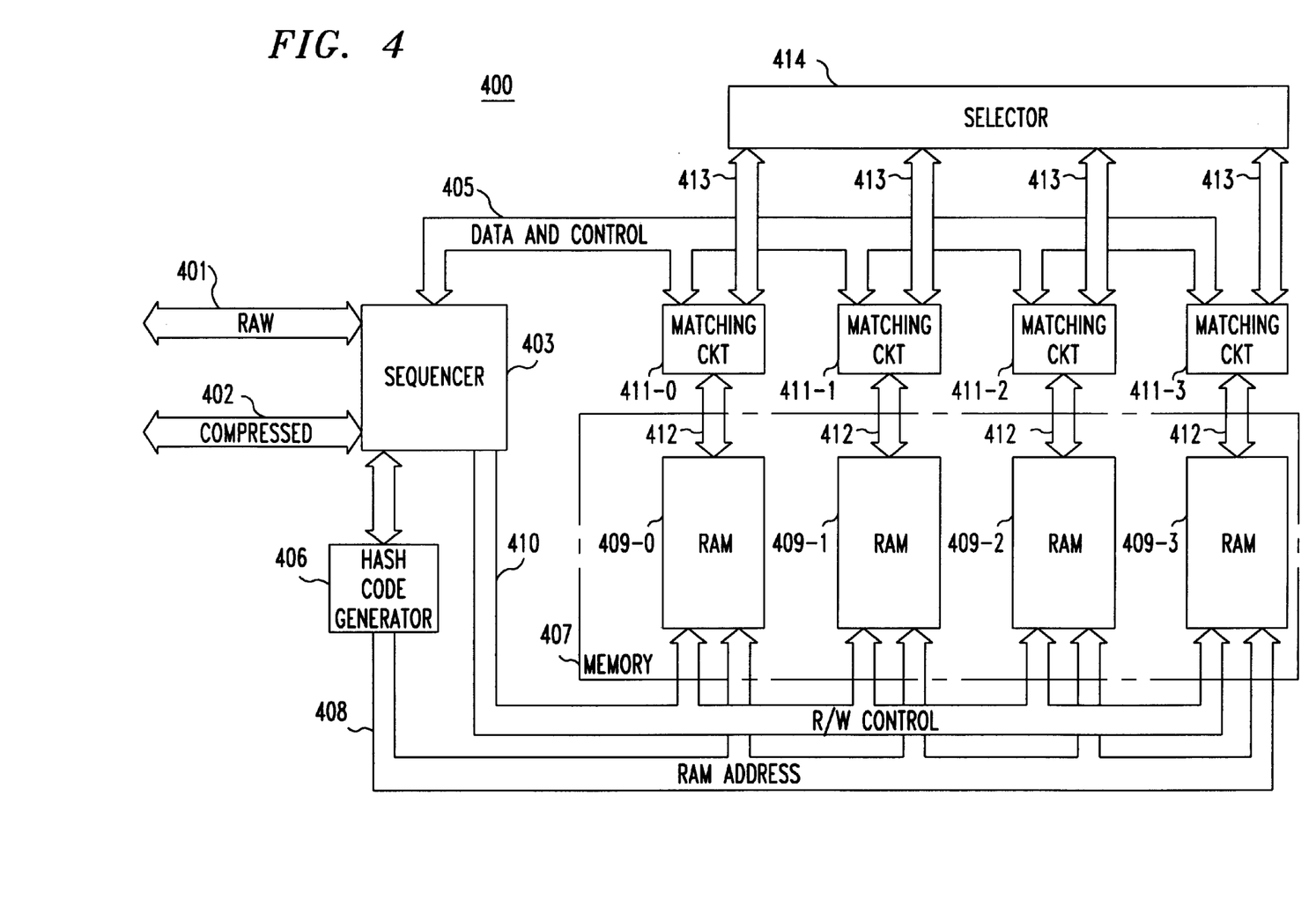
FIG. 4 is a block-schematic diagram of encoding or decoding apparatus incorporating the present invention.

Refer now to FIG. 4 which shows a block-schematic diagram of circuitry 400 which operates in accordance with the present invention. While circuitry 400 can be utilized in an encoder or decoder and can utilize any of a number of different data compression/decompression algorithms, for illustrative purposes, circuit operation will be first described in reference to an encoder which utilizes the flowchart of FIG. 3. When operating as an encoder, the input character sequence is received on bus 401 and the encoded output is provided on bus 402. Sequencer 403 can be implemented as a finite state machine (FSM) with well-known logic devices. The sequencer forms the successive character strings previously discussed by retrieving successive characters from bus 401. Each of these strings is coupled at the appropriate time to bus 405 and to hash code generator 406. The hashed row address applied to the memory is also readable by the sequencer for use in step 315. This ability is also required by the decoder, to be described below, as is the ability to bypass the hashing operation and to directly generate an "unhashed" RAM address. The output of generator 406 determines the subset of memory examined for each character string. This is coupled to memory 407 by bus 408. In FIG. 4, the memory includes four N by 1 entry RAMS, where N is a predetermined integer which establishes the number of rows in memory. These RAMS are designated as 409-0 through 409-3. The read/write signals for the memory are generated by the sequencer and coupled to the memory via bus 410.

Matching circuits 411-0 through 411-3 are supplied with each character string and each matching circuit is connected to a different one of the RAMS via an associated bus 412. Each matching circuit provides the comparisons described in step 308 and couples the results of these comparisons on an associated one of buses 413 to selector 414. The selector determines the memory location to be written into when the searched string is not found in the examined subset. This determination is coupled back to the matching circuit associated with this memory location via the appropriate bus 413. The unmatched string is then stored in the determined memory location on the occurrence of a write signal on bus 410. The state of the parameter MATCH for each matching circuit is also coupled to sequencer 403 via bus 405. This state determines the next character string formed. Upon receiving each indication that the current string has been matched, sequencer 403 also loads a register with this string and retains it as the last matched character string.

Figure 5:
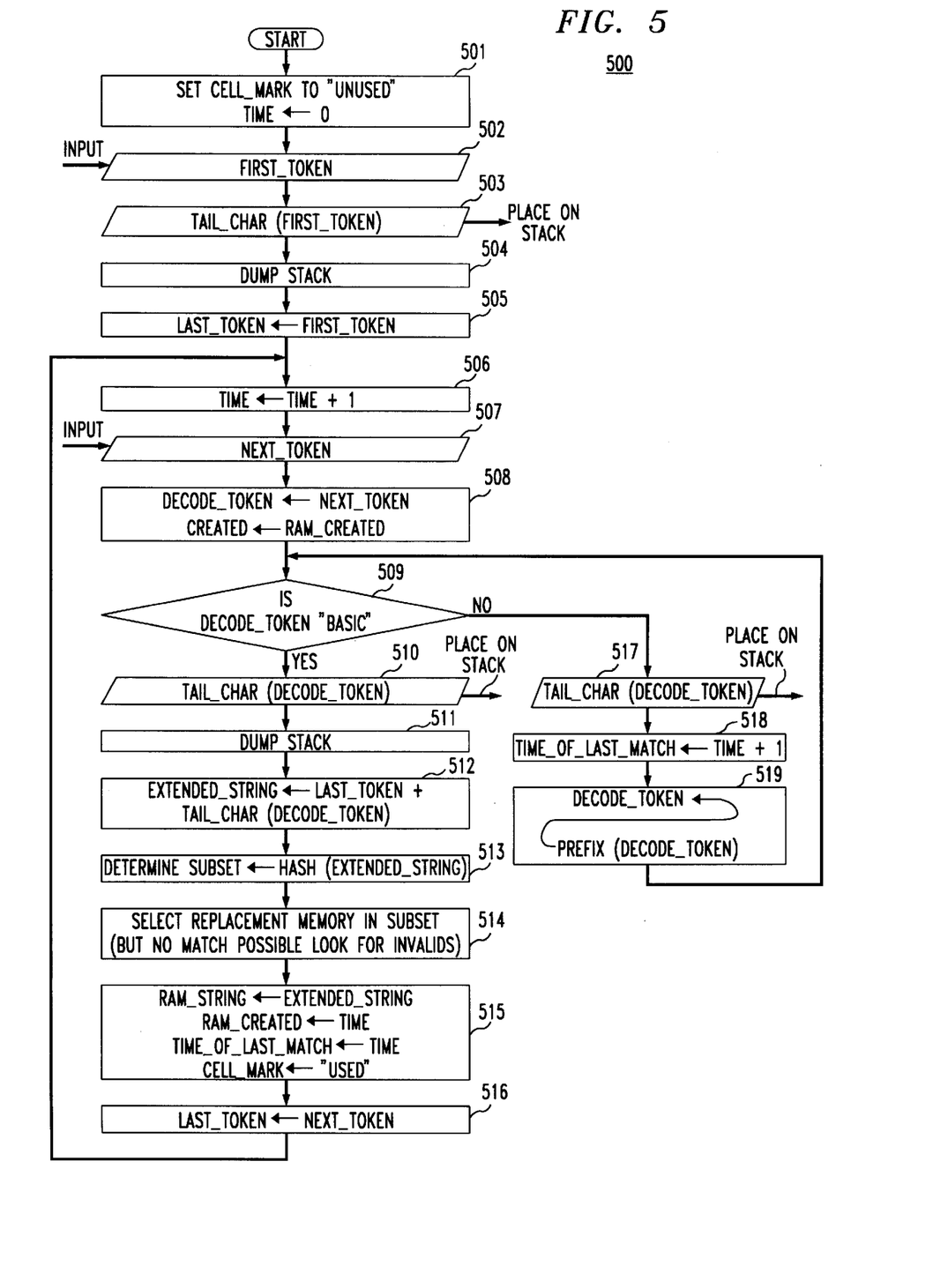
FIG. 5 is a flow chart depicting the sequence of operations performed by decoding apparatus in accordance with the present invention.

FIG. 5 shows the sequence of operations 500 performed by a decoder which incorporates the present invention. This sequence accepts the tokens outputted by an encoder and decodes each token into the representative input character string. At step 501, the variable CELL_MARK for all memory locations in the adaptive portion of the decoder memory is set to UNUSED and the sequencer variable TIME is loaded with 0. At step 502, the first token is retrieved and loaded as the variable FIRST_TOKEN and the tail character of this token is extracted at step 503. As FIRST_TOKEN is representative of a basic character and a virtual memory address, in the disclosed embodiment, the tail character of FIRST_TOKEN, designated by the function TAIL_CHAR (FIRST_TOKEN), can be formed by extracting the last 8 bits of FIRST_TOKEN. For other tokens, the function TAIL-CHAR of that token can be formed by examining the contents of the memory address equal to the value of the token and then extracting the last eight bits of the information stored in that address.

The function TAIL_CHAR(FIRST_TOKEN) is placed on a stack at step 503 and this stack is dumped at step 504. TAIL_CHAR of any argument is always a single character so each time the stack is incremented, a single character is placed on the stack. Whenever the stack is dumped, i.e., in step 504 and subsequently in step 511, the characters on the stack are outputted in a last-in, first-out order. For FIRST_TOKEN, the stack dumping in step 504 produces just a single character.

The parameter LAST_TOKEN is loaded with FIRST_TOKEN at step 505 and, at step 506, the variable TIME is incremented by 1. The variable NEXT_TOKEN is loaded in step 507 with the next token received from the encoder. At step 508, the variable DECODE_TOKEN is loaded with NEXT_TOKEN. Since NEXT_TOKEN is an actual memory address, DECODE_TOKEN is also such an address. At step 508, the variable CREATED is loaded with the value of RAM_CREATED for the variable NEXT_TOKEN. The value of RAM_CREATED is obtained by addressing the decoder memory using DECODE_TOKEN and extracting the time stored at this address indicative of the time decoding information was stored at this address. For a token representative of a basic character, the variable RAM_CREATED is 0. At step 509, a decision is made as to whether DECODE_TOKEN is representative of a basic character. In the disclosed embodiment, this decision is made by examining the first four bits in any 12 bit token. For a token representative of a basic character, the first four bits are all 0.

At step 509, processing takes one of two alternative paths depending on whether DECODE_TOKEN is representative of a basic character. When it is not, processing proceeds to step 517. At this step, the decoder memory is addressed using DECODE_TOKEN and the decoding information stored at this address is extracted. In the disclosed embodiment, the last 8 bits at this address are the function TAIL_CHAR(DECODE_TOKEN) and such bits are representative of the last character added to an encoder string.

These last eight bits are placed on the stack at step 517. One plus the current time is loaded into the variable TIME_OF_LAST_MATCH at step 518. This offset by 1 is necessary to provide consistency between the encoder and decoder memory entries. The portion of the decoding information stored at the address indicated by the value of DECODE_TOKEN other than the tail character is referred to as the prefix and is another memory address. The prefix is loaded into DECODE_TOKEN at step 519. From step 519, processing returns to step 509.

If the decision at step 509 is that DECODE_TOKEN is representative of a basic character, then processing proceeds to step 510 where the same operations performed in step 503 are provided, namely, the tail character of DECODE_TOKEN is placed on the stack and, at step 511, this stack is dumped in a last-in, first-out order. It should be noted that since DECODE_TOKEN must be representative of a basic character to reach step 510, a memory extraction is not necessary in this step. The tail character of DECODE_TOKEN is appended to LAST_TOKEN at step 512 and loaded as the variable EXTENDED_STRING. This variable is then hashed at step 513 to determine the subset in memory where the value of EXTENDED_STRING will be stored. Step 514 determines this memory location using the same criteria used in the encoder, namely, invalid locations will be selected first, then any empty locations, then if neither of the previous criteria is applicable, the LRU criteria is used. At step 515, which is analogous to step 411, the current string is loaded into the selected memory location and is shown in FIG. 5 as being loaded into the variable RAM_STRING. In addition, the current time is loaded into the variable RAM_CREATED and TIME_OF_LAST_MATCH for this location. Finally, the parameter CELL_MARK for this location is marked as USED. Processing now proceeds to step 516 where LAST_TOKEN is loaded with NEXT_TOKEN which was retrieved at step 507. From step 516, processing returns to step 509.

Refer again to FIG. 4 which shows a block diagram of circuitry 400, previously described for operation as an encoder in accordance with the present invention. The circuitry of 400 is equally applicable to operation as a decoder as will be described relative to the flowchart of FIG. 5.

When operating as a decoder, the input token sequence is received on bus 402, and the decoded character sequence is provided on bus 401. Sequencer 403 forms the successive decompressed character streams by retrieving successive tokens from bus 402. Tokens corresponding to basic characters (leading four bits all 0's) are decoded directly by sequencer 403 from the eight least significant bits of the token without reference to the RAM, as in blocks 503 and 510 of FIG. 5.

When any token is determined to be "non-basic" (block 509 of FIG. 5), the sequencer passes the most significant 10 bits of the token without hashing to bus 408 as the memory storage row of the token. This coupling without hashing is provided by coupling the bits through the hash code generator after it has been temporarily disabled. At the same time, the sequencer passes the 11th and 12th bits of the token via bus 405 to cause the corresponding matching circuit 411-1, 411-2, 411-3, or 411-4 to return the contents of the RAM row-column entry via bus 405 for decoding.

In block 517 of FIG. 5, the tail character decoded from this RAM entry is decoded by sequencer 403. The RAM TIME_OF_LAST_MATCH for the selected entry is updated with the value TIME+1 (block 518), and the sequencer uses the prefix part of the RAM entry to update DECODE_TOKEN (block 519), and then repeats the test in block 509. Note that the loop from block 509 into blocks 517–519 causes the tail characters to be extracted by the decoder in the reverse order from that in which they were received by the encoder. Sequencer 403 includes one or more "stacks" (last-in, first-out stores) onto which each decoded tail character is placed (blocks 503, 510 and 517 of FIG. 5) to return the decoded sequences in correct order.

In the disclosed embodiment, a multiplicity of such stacks are provided so that they may each be filled by sequencer 403, in turn, while the contents of previously filled stacks are outputted in correct order via bus 401. The number of stacks required to avoid roadblocking of the sequencer is determined by the expected compression characteristics of the encoded stream, and the ratio of the maximum transfer rates over buses 402 and 401.

After the sequencer releases the stack for dumping (block 511), it then forms a new memory entry according to flowchart blocks 512 through 515. In accordance with the present invention, it is essential that the decoder memory entries exactly match the corresponding entries in the encoder, and in the circuitry of 400 the sequencer 403 makes use of the same elements as described for the encoder case above, i.e., hash code generator 401, matching circuits 411-1, 411-2, 411-3, and 411-4, and selector 414, to exactly reproduce the operations at the encoder, controlling and exchanging data with these elements over buses 405, 408, and 410.

In certain encoding/decoding applications, the input digital signal stream can have a virtually infinite length. As a result, the use of the time-based entries TIME, and all other time-based entries in sequencer 403, as well as RAM_CREATED and TIME_OF_LAST_MATCH is troublesome due to the finite length of any time-tracking apparatus. To overcome this limitation, the time-based variables in the disclosed embodiment are represented as binary integers of 18 bits. Referring back to the flow charts of FIG. 3 and FIG. 5, it is clear that the time value will overflow after $2^{18}$ new entries have been made. To preserve the consistency of all of the time entries, the disclosed embodiment makes use of the concept of "current" and "prior" epochs, identified by the value of the most significant bit of the binary representation. The current epoch is defined by the most significant bit of the global register TIME, which is allowed to "wrap-around", and all other time representations in sequencer registers and memory are interpreted as belonging to the current or prior epoch, respectively. Current epochs are recognized by an equality between the most significant bits stored in the registers associated with the time-based variables and the most significant bit of the global register TIME. Prior epochs are recognized by the inequality between these same most significant bits. After a significant part of the current epoch has transpired, and well before the expiration of the current epoch, background processes are started in both encoder and decoder to mark as UNUSED all entries in memory whose most significant bit of RAM_CREATED identifies them as originating in the prior epoch. These background processes are given sufficient time to assure that they will have eliminated all prior-epoch entries before the expiration of the current epoch. Furthermore, the timing of these two "scrubbing" processes is matched in the encoder and decoder to maintain the consistency of the memories in the two units. Implementation of this strategy is straightforward to one of ordinary skill in the art.

It should, of course, be noted that while the present invention has been described in terms of an illustrative embodiment, other arrangements will be apparent to those of ordinary skill in the art. For example, while the operations shown in FIGS. 3 and 5 may have been described as occurring serially, many of these operations can advantageously be performed in parallel. In addition, in applications where encoding operations are not continuous, the decoder must be apprised of a suspension of encoder operation in order to avoid creating a superfluous entry in its memory. To prevent the creation of such an entry, a special token indicative of suspension of encoder operations is transmitted by the encoder to the decoder. This technique is also well-known in the art.

We claim:

1. A method for storing a plurality of arbitrary sequences of digitally encoded symbols in a memory device, the method comprising the steps of:

(a) partitioning the memory device into a plurality of storage sets; and (b) subdividing each storage set into a plurality of slots, each slot adapted to store one digitally encoded symbol and control information associated with the digitally encoded symbol, wherein the control information specifies the presence or absence of a digitally encoded symbol; and, when a digitally encoded symbol is present, that control information further specifying:

(a) the time at which the digitally encoded symbol was loaded into the memory device;

(b) the time at which the memory device was last successfully searched to locate the digitally encoded symbol; and (c) when the digitally encoded symbol is not the first symbol in the arbitrary sequence of digitally encoded symbols, the control information also specifying the address of the storage set, and the address of the slot within that storage set, of the immediately preceding digitally encoded symbol of the arbitrary sequence of digitally encoded symbols.

2. An apparatus for storing a plurality of arbitrary sequences of digitally encoded symbols, the apparatus comprising a memory device partitioned into a plurality of storage sets, wherein each storage set is subdivided into a plurality of slots, each slot adapted to store one digitally encoded symbol and control information associated with the digitally encoded symbol, wherein the control information specifies the presence or absence of a digitally encoded symbol; and, when a digitally encoded symbol is present, that control information further specifying:

(a) the time at which the digitally encoded symbol was loaded into the memory device;

(b) the time at which the memory device was last successfully searched to locate the digitally encoded symbol; and (c) when the digitally encoded symbol is not the first symbol in the arbitrary sequence of digitally encoded symbols, the control information also specifying the address of the storage set, and the address of the slot within that storage set, of the immediately preceding digitally encoded symbol of the arbitrary sequence of digitally encoded symbols.

3. The apparatus of claim 2 further comprising:

(a) a hashing device for identifying the storage set in which each successive digitally encoded symbol of the arbitrary sequence of digitally encoded symbols is stored;

(b) a selection device for selecting a slot in a storage set into which a new digitally encoded symbol is to be inserted, the selection device including means for selecting a currently stored digitally encoded symbol to be replaced when all locations within that storage set are occupied; the selection device selecting the digitally encoded symbol to be replaced based upon a Least Recently Used (LRU) criterion;

(c) a comparing device for determining whether or not a stored digitally encoded symbol matches a given digitally encoded symbol in the arbitrary sequence of digitally encoded symbols; and (d) a symbol validity determination device for determining whether or not a stored digitally encoded symbol is valid, the validity determination device determining the validity of a stored digitally encoded symbol even if this symbol matches a digitally encoded symbol in the arbitrary sequence of digitally encoded symbols, wherein a stored digitally encoded symbol is invalid if it has previously been selected for replacement by the selection device.

4. The apparatus of claim 3 wherein the comparing device recognizes a match between a stored digitally encoded symbol and a given digitally encoded symbol in the arbitrary sequence of digitally encoded symbols by determining that:

(a) the stored digitally encoded symbol matches the given digitally encoded symbol in the arbitrary sequence of digitally encoded symbols; and (b) the control information associated with the stored digitally encoded symbol, and specifying a storage set and slot for an immediately preceding symbol, actually specifies the storage set and slot of the immediately preceding symbol of the arbitrary sequence of digitally encoded symbols.

5. The apparatus of claim 3 wherein the symbol validity determination device determines the validity of a stored digitally encoded symbol based upon the control information associated with that stored digitally encoded symbol if neither of the two following invalidating conditions is indicated:

(a) the storage set and slot of the immediately preceding symbol as set forth in the control information of the stored digitally encoded symbol does not match the storage set and slot of the immediately preceding symbol in the arbitrary sequence of digitally encoded symbols; and (b) the time at which the stored digitally encoded symbol was loaded into the memory device, as specified by the control information, is earlier than the time at which the immediately preceding symbol of the arbitrary sequence of digitally encoded symbols was loaded into the memory device.

6. The apparatus of claim 3 further comprising a searching device for locating a storage set in which a successive symbol of the arbitrary sequence of digitally encoded symbols is located, the searching device locating the storage set by using a concatenation of:

(a) the storage set of the immediately preceding digitally encoded symbol in the arbitrary sequence of digitally encoded symbols;

(b) the slot of the immediately preceding symbol within that storage set; and (c) the digitally encoded representation for a symbol immediately succeeding the successive symbol of the arbitrary sequence of digitally encoded symbols; wherein the concatenation of (a), (b) and (c) represents an input to an address generating device.

7. The apparatus of claim 6 wherein the address generating device is a hash coding table stored in an electronic memory device.

8. The apparatus of claim 2 wherein the time at which the digitally encoded symbol was loaded into the memory device, and the time at which the memory device was last successfully searched to locate the digitally encoded symbol, are represented using finite integer encoding, based on an appropriate measure of the real passage of time, requiring only that the generated time values always wrap around between successive loading and searching operations, and any wrap around of time values is resolved by partitioning the time values into a first epoch and a second epoch based upon the most significant bit of the time value, and defining a current epoch as either the first epoch or the second epoch, based upon the most significant bit of the current time value, and defining a prior epoch as the epoch with the opposite sign of the most significant bit, and treating all time values in said prior epoch as having occurred before the time values of said current epoch such that time values in the current epoch are processed after time values in the prior epoch.

9. The apparatus of claim 8 wherein, after each rollover of the most significant bit, all storage sets of the prior epoch are selected for replacement.

* * * * *